April 10, 1951            F. KOURIL            2,548,482
VERTICALLY ADJUSTABLE CROP SPRAYING ATTACHMENT
Filed Oct. 2, 1947            2 Sheets-Sheet 1
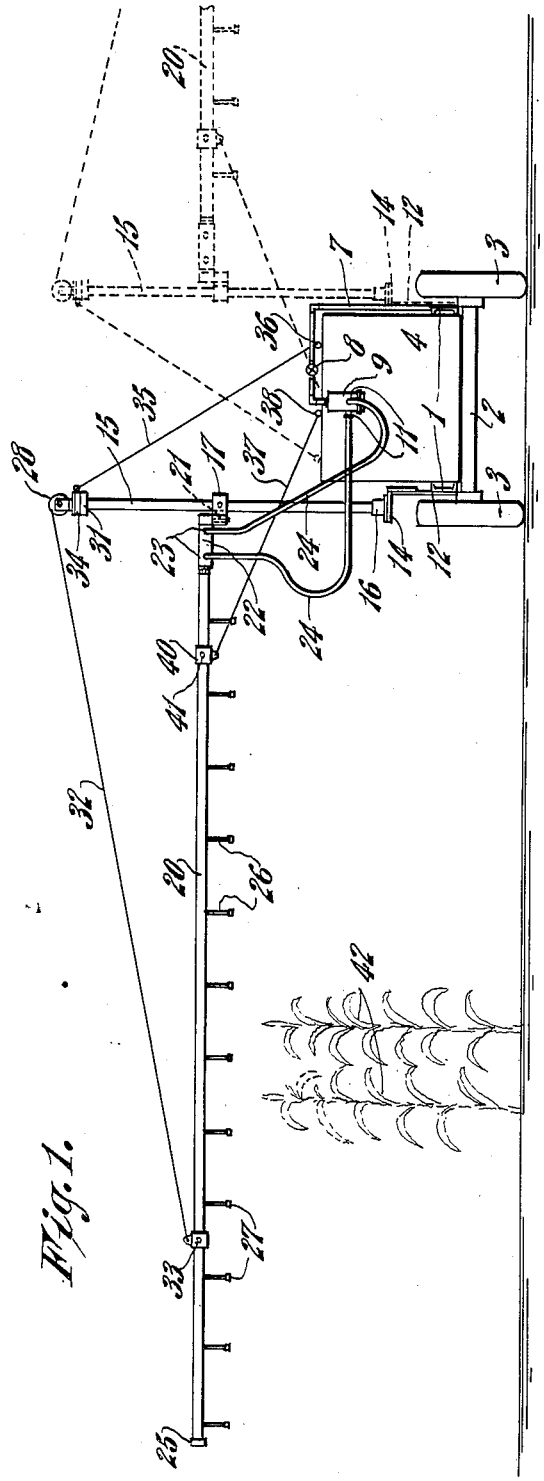
INVENTOR,
Frank Kouril,
BY
Blake A. Seaver.
Attorney.

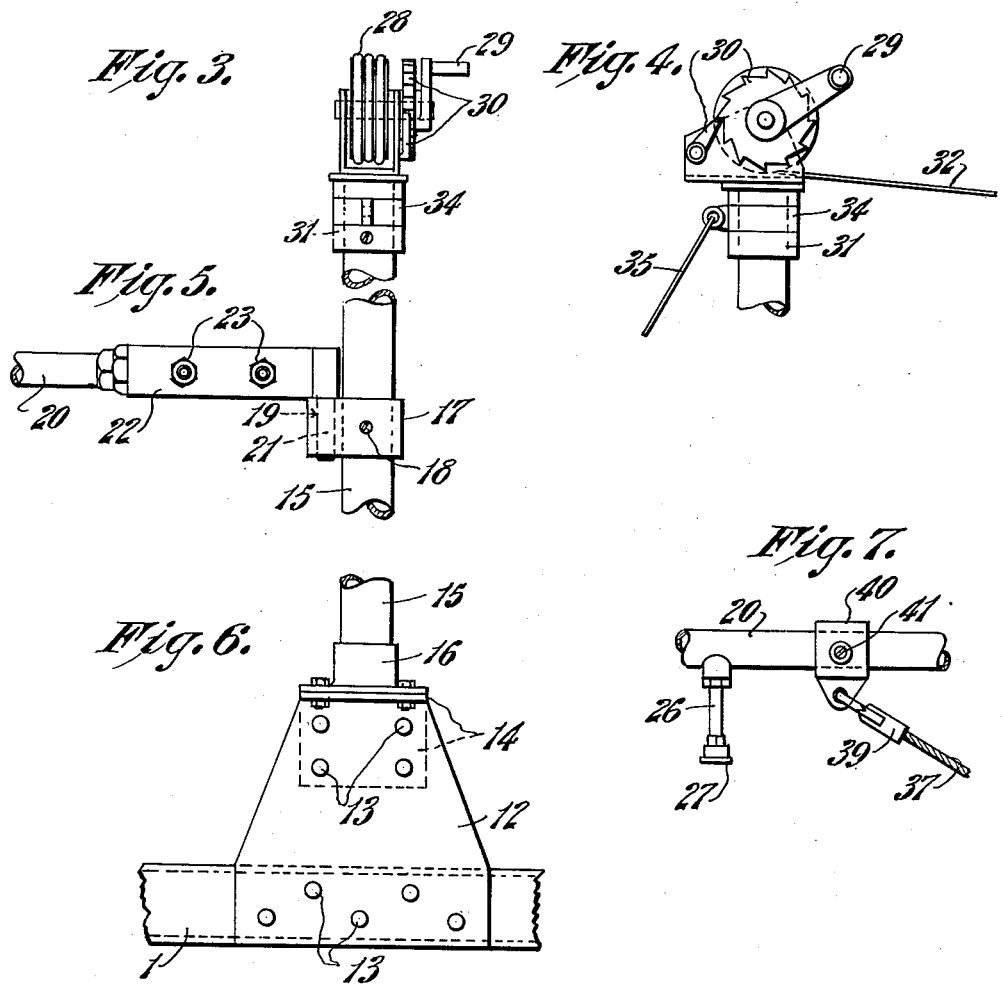

Patented Apr. 10, 1951

2,548,482

UNITED STATES PATENT OFFICE 2,548,482

VERTICALLY ADJUSTABLE CROP SPRAYING ATTACHMENT

Frank Kouril, Springfield, Mass.

Application October 2, 1947, Serial No. 777,557

2 Claims. (Cl. 299—30)

This invention relates to improvements in spraying apparatus, particularly to that type of spraying apparatus used in the protection of vegetable crops and the like.

An object of this invention is the provision of spraying apparatus adaptable for spraying mature, or partially mature, crops which have attained a substantial growth and height above the ground.

A further object of this invention is the provision of spraying apparatus which will cover, adequately and efficiently, a large number of rows of vegetable crops simultaneously, without disturbing or touching the plants.

A still further object of this invention is the provision of spraying apparatus of the character described, which is adaptable to travel on a narrow road or track when not in use.

These, and other objects and advantages will be clearly and concisely disclosed and described in this specification, the accompanying drawings, and the appended claims.

Broadly, this invention includes, in combination with a wheeled frame, a spray storage tank on the frame, and a pump on the frame connected to the tank, a mast supported on the frame, a hollow or tubular boom pivotally and slidably supported on the mast, a plurality of spaced spray heads secured to and communicating with the interior of the tubular boom, and flexible communicating means between the outlet of the pump and the hollow boom, whereby a liquid in the tank may be forced into the boom by the pump and thence to the spray heads, from which the liquid is delivered.

A preferred embodiment of this invention is illustrated in the accompanying drawings, in which Fig. 1 is an elevational view of the spraying apparatus, Fig. 2 is a plan view of the same, Fig. 3 is an elevational view of a cable winch at the top of the mast, Fig. 4 is a side view of the winch shown in Fig. 3, Fig. 5 is an elevational view of the boom support, Fig. 6 is an elevational view of the mast support, and Fig. 7 is a partial view of a section of the boom, showing a spray head connection.

Referring now to the drawings in detail, in which like numerals refer to like parts throughout, A trailer chassis having frame members 1, an axle 2, and wheels 3, has mounted thereon a spray storage tank 4 and pump 5. The inlet of the pump 5 is connected to the tank 4 by means of a pipe 6, and the outlet of the pump 5 is connected by means of a pipe 7 and valve 8 to a pressure chamber 9. An overflow pipe 10 leads from the pump 5 back to the tank 4, and serves to circulate the spray from the tank 4 through the pump 5 and back to the tank 4 when the valve 8 is closed. The pressure chamber 9 is provided with hose connections 11. All this described construction is standard, and forms no part of this invention except in combination with the new construction hereinafter described.

A gusset or framing plate 12 is secured on the frame member 1 by any suitable means, such as rivets or bolts 13, and an angle 14 is supported on the plate 12 in a similar manner. A mast 15 is supported on the angle 14 by means of a flange 16, and a collar 17 is slidably supported on the mast 15 and held in adjusted position by means of one or more set screws 18.

The collar 17 is provided with a vertical bore 19, and a hollow or tubular boom 20 is pivotally supported on the collar 17 by means of a stud 21 rotatably supported in the bore 19. The inner, or mast end of the boom 20 is connected to a chamber 22 provided with hose connections 23, and when the boom 20 is in operation, communication is provided between the pressure chamber 9 and the chamber 22 by means of flexible hoses 24. The outer end of the boom 20 is closed or sealed with a cap 25. The boom 20 is provided with a plurality of spaced spray connections 26 communicating with the interior of the boom 20, and each of the connections 26 is provided with a spray head 27. The connections 26 are spaced according to the usual practice in the spacing of plant crops with which the device is to be used.

The mast 15 extends a substantial distance above the normal position of the boom 20, and a winch 28, provided with a crank 29, ratchet and pawl brake 30, and supporting collar 31, is pivotally mounted on the top of the mast 15. A cable 32 is anchored in the winch 28 and connected or secured to a collar 33 on the boom 20, and, as the boom 20 is raised and lowered on the mast 15, adjustment is provided by the winch 28 to maintain the cable 32 in a taut, boom supporting condition.

A collar 34 is pivotaly mounted or supported on the mast 15 above the collar 31, and guy wires or cable 35, connected to the collar 34, are anchored to eye bolts 36 at front and rear of the tank 4.

Guy wires or cables 37 are connected to eye bolts 38 at front and rear of the tank 4, and the opposite ends of these wires or cables 37 are removably connected to the boom 20 by means of spring clips 39 removably connected to a collar 40, which collar 40 is slidably supported on the boom 20, to compensate for vertical movement of the boom 20, and held in adjusted position by one or more set screws 41. By disconnecting the cables 37, the boom 20 may be swung either forward or backward, perpendicular to the axis of the wheels 3, as indicated by dotted lines and by arrows 43 in Fig. 2, for traveling on a road or highway.

As indicated in Fig. 1 by dotted lines, the mast 15, boom 20, etc., may be duplicated on the opposite side of the trailer or tank 4, when it may be desired to cover substantially twice as much area in one trip.

It will be readily understood by those skilled in the art that, with this apparatus, a great many rows of crops may be sprayed at the same time, and the spraying may be done at any time between start of growth and full maturity, the boom being vertically adjusted to the correct height relative to the existing height of the crops to be sprayed. As indicated in Fig. 1 at 42, fully matured crops of tall corn are easily and efficiently sprayed with this apparatus.

What I claim is:

1. A removable spraying apparatus for a spraying machine having a frame, a tank and pump on the frame, and pipe connections between said tank and an inlet of said pump; said apparatus comprising a cylindrical mast removably and vertically supported on said frame, a collar slidably supported on said mast, a substantially horizontal, hollow boom having one end closed and rotatably mounted on said collar on a vertical axis and the opposite end plugged, said boom being provided, between said ends, with a plurality of spaced spray heads, flexible hoses communicating with an outlet of said pump and the interior of said hollow boom, a collar slidably supported on said boom adjacent said plugged end, a winch revolvably supported on the top of said mast, and a cable connecting said last named collar and said winch.

2. A removable spraying apparatus for a spraying machine having a frame, a tank and a pump on the frame, and pipe connections between said tank and an inlet of said pump; said apparatus comprising a cylindrical mast removably and vertically supported on said frame, a collar slidably supported on said mast, a substantially horizontal, hollow boom having one end closed and rotatably mounted on said collar for swinging movement in a horizontal plane and the opposite end plugged, said boom being provided, between said ends, with a plurality of spaced spray heads, flexible hoses communicating with an outlet of said pump and the interior of said hollow boom, a collar slidably supported on said boom adjacent said plugged end, a winch revolvably supported on the top of said mast, a cable connecting said last named collar and said winch, a third collar slidably supported on said boom adjoining said closed end, cable guys connecting said third collar and said tank and adapted to be disconnected from said third collar to permit swinging movement of said boom forward or backward from its normal operating position.

FRANK KOURIL.

REFERENCES CITED

The following references are of record in the file of this patent:

UNITED STATES PATENTS

| Number | Name | Date |
|---|---|---|
| Re. 11,736 | Twining | Apr. 25, 1899 |
| 533,577 | Ainger | Feb. 5, 1895 |
| 922,190 | Reno | May 18, 1909 |
| 1,470,246 | Willis et al. | Oct. 9, 1923 |
| 1,633,294 | Stubenberg | June 21, 1927 |
| 1,883,479 | Bateman et al. | Oct. 18, 1932 |
| 1,943,655 | Cummings | Jan. 16, 1934 |
| 2,273,344 | Black et al. | Feb. 17, 1942 |
| 2,305,913 | Troyer | Dec. 22, 1942 |

FOREIGN PATENTS

| Number | Country | Date |
|---|---|---|
| 359,971 | France | Feb. 8, 1906 |
| 426,698 | France | May 10, 1911 |
| 557,785 | France | May 11, 1923 |